United States Patent [19]

Hayhurst, Jr.

[11] Patent Number: 4,627,322

[45] Date of Patent: Dec. 9, 1986

[54] CIRCULAR SAW BLADE ASSEMBLY

[75] Inventor: Vondene D. Hayhurst, Jr., Nicoma Park, Okla.

[73] Assignee: Lebever Co., Oklahoma City, Okla.

[21] Appl. No.: 777,241

[22] Filed: Sep. 17, 1985

[51] Int. Cl.$^4$ .................... B23D 61/02; B27B 17/02; B27B 33/14

[52] U.S. Cl. ...................... 83/831; 83/838; 83/839

[58] Field of Search ................ 83/830, 831, 838, 839, 83/845, 788, 834

[56] References Cited

U.S. PATENT DOCUMENTS

| | | | |
|---|---|---|---|
| 21,651 | 10/1858 | Carpenter | 83/838 |
| 33,270 | 9/1861 | Spaulding | 83/838 |
| 182,178 | 9/1876 | Disston | 83/838 |
| 411,189 | 9/1889 | Grey | 83/838 |
| 869,574 | 10/1907 | Huther | 83/838 |
| 2,958,348 | 11/1960 | Bueneman | 83/838 |
| 3,329,183 | 7/1967 | Robinson | 83/834 |
| 4,102,231 | 7/1978 | Jägers | 83/839 X |
| 4,203,215 | 5/1980 | Ochiai et al. | 83/838 X |
| 4,484,504 | 11/1984 | Atkinson | 83/834 X |

Primary Examiner—Horace M. Culver
Attorney, Agent, or Firm—Glen M. Burdick

[57] ABSTRACT

A circular saw blade assembly adapted to be secured to a power-driven saw arbor and rotated thereby, which comprises a circular saw blade formed of first and second discs, the discs defining a central bore extending through a medial portion thereof and diverging radially from the medial portion to form a relief opening extending to the peripheral portion of the disc so as to define a chain track peripheral portion, disc connector elements disposed within the relief opening for connecting the first and second discs at a position between the medial portions of the disk and the chain track peripheral portion, and a chain saw having a plurality of cutter elements projected outwardly from one side thereof and a plurality of drive link elements projecting outwardly from an opposite side thereof, the saw chain extendible about the perimeter of the first and second discs such that the drive link elements are disposed within the chain track peripheral portion and frictionally engage the first and second discs defining the chain track peripheral portion.

5 Claims, 3 Drawing Figures

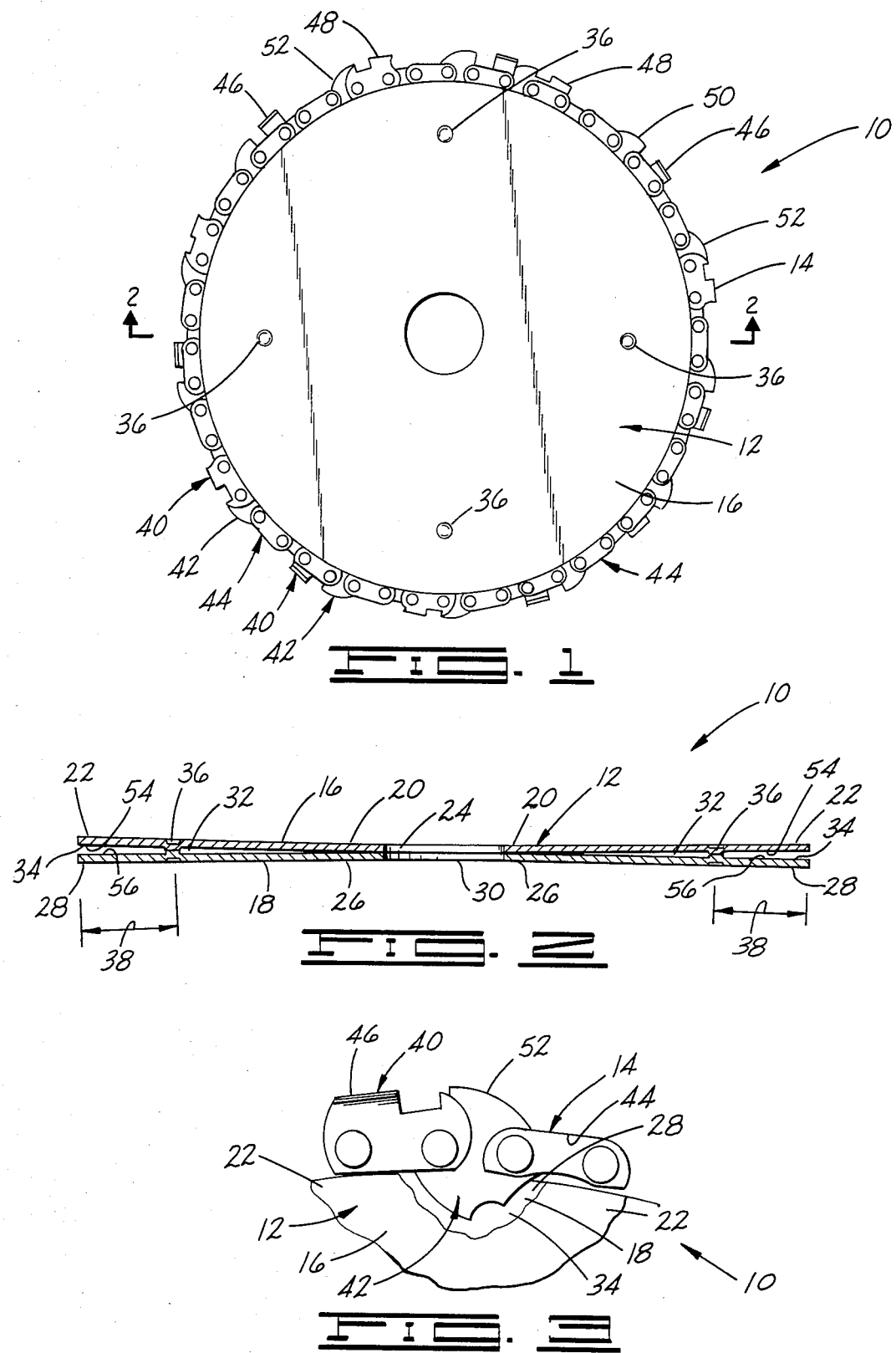

CIRCULAR SAW BLADE ASSEMBLY

BACKGROUND OF THE INVENTION

1. Field of the Invention

The present invention relates to a circular saw, and more particularly, but not by way of limitation, to a circular saw blade assembly having a detachable saw chain supported along the perimeter of the blade assembly.

2. Brief Description of Prior Art

Circular saws have heretofore been known. Such saws have been generally used as cross-cut saws. In recent years improvements have been made in the circular saw industry, both in the design of the saw blade and in the design and construction of cutting elements of the saw blade. For example, U.S. Pat. No. 2,958,348, discloses a circular saw having a circular saw blade or mounting portion. The saw blade is provided with an annular groove about its perimeter which is adapted to hold a detachable saw chain. The saw chain is secured to the saw blade for rotation with the saw blade as a unit by inserting a plurality of connector pins through the portion of the sawblade defining the annular groove for locking engagement with the depending anchor portion of the raker links disposed within the annular groove. Thus, the connector pins have a dual function, namely, to unite the saw chain and the saw blade, and to hold the saw chain radially inwardly on the saw blade so as to prevent the saw chain from being thrown outwardly under the urging of the centrifugal force generated during operation of the saw.

While the prior art devices, such as the circular saw disclosed in U.S. Pat. No. 2,958,348, have met with some success, problems have nevertheless been encountered due to the expense in the milling or cutting a precision annular groove about the perimeter of the blade for mounting of the saw chain, and the tendency of the blade to throw the saw chain outwardly due to the centrifugal force generated by the operation of the saw. Therefore, it would be highly desirable if one could construct a circular saw blade assembly which did not require precision milling of a blade, while at the same time overcomes the tendency of the saw chain to be thrown outwardly because of the centrifugal force generated during operation of the saw.

SUMMARY OF THE INVENTION

The present invention provides an improved circular saw blade assembly adapted to be secured to a power-driven saw arbor and rotated thereby. Broadly, the circular saw blade assembly comprises a circular saw blade formed of first and second discs, the first and second discs each having a medial portion, a peripheral portion and a central bore extending through the medial portion. The medial portion of the first and second discs are disposed substantially adjacent so that the bores therein are aligned and adapted to receive the power-driven saw arbor. The first and second discs diverge radially from the medial portion to form a relief opening extending to the peripheral portion of the discs and define a chain track peripheral portion. A plurality of disc connector elements are disposed within the relief opening for connecting the first and second discs together at a position between the medial portion of the discs and the chain track peripheral portion. A saw chain, having a plurality of cutter elements projecting outwardly from one side thereof and a plurality of drive link elements projecting outwardly from an opposite side thereof, is extendible about the perimeter of the discs such that the drive link elements of the saw chain are disposed within the chain track peripheral portion and frictionally engage the first and second discs defining the chain track peripheral portion.

An object of the present invention is to provide an improved circular saw blade assembly adapted to be secured to a power-driven saw arbor and rotated thereby.

Another object of the present invention, while achieving the above-stated object, is to provide an improved circular saw blade assembly wherein the design substantially eliminates the tendency of the saw chain to be thrown outwardly under the urging of centrifugal force generated during operation of tne circular saw.

Another object of the present invention, while achieving the above-stated objects, is to provide an improved circular saw blade assembly which is economical to manufacture, easy to use, does not require precision milling in the formation of a chain track, and which does not suffer from the disadvantages of the prior art devices.

Other objects, advantages and features of the present invention will be apparent to those skilled in the art from the following detailed description when read in conjuntion with the drawings and appended claims.

BRIEF DESCRIPTION OF THE DRAWINGS

FIG. 1 is a side view of a circular saw blade assembly constructed in accordance with the present invention.

FIG. 2 is a sectional view of the circular saw blade assembly of FIG. 1 taken along the line 2—2 wherein the saw chain has been removed to illustrate a relief cavity and a chain track peripheral portion defined by first and second discs of the blade assembly.

FIG. 3 is an enlarged, partially cut-away side view of a portion of the circular saw blade assembly of the present invention illustrating a drive link element of a saw chain disposed in a chain track peripheral portion defined by the first and second discs.

DESCRIPTION OF PREFERRED EMBODIMENTS

Referring now to the drawings, a circular saw blade assembly 10 of the present invention is illustrated. The circular saw blade assembly 10 comprises a circular saw blade 12 and a saw chain 14 extendible about the perimeter of the circular saw blade 12. The circular saw blade assembly 10 is secured to a powered saw arbor (not shown) for rotation simultaneously with the saw arbor in a customary manner.

Referring more specifically to FIG. 2, the details of the construction of the circular blade 12 of the circular saw blade assembly 10 is more clearly illustrated. The circular blade 12 is formed of a first disc 16 and a second disc 18. The first disc 16 is provided with a medial portion 20, a peripheral portion 22 and a central bore 24 extending through the medial portion 20 thereof; and the second disc 18 is likewise provided with a medial portion 26, a peripheral portion 28, and a central bore 30 extending through the medial portion 26 thereof. The first and second discs 16, 18, which are substantially mirror images of each other, are disposed substantially adjacent so that the central bores 24 and 30 of the first and second discs 16 and 18, respectively, are aligned and adapted to receive a power-driven saw arbor (not shown). The first disc 16 diverges radially from the medial portion 20 defining the central bore 24; and the second disc 18 diverges radially from the medial portion 26 defining the central bore 30 therein. Thus, in an assembled mode of the first and second discs 16 and 18 a relief opening 32 is formed between the first and second discs 16 and 18 which extends from the medial portions 20, 26 of the first and second discs 16, 18, respectively, to the peripheral portions 22, 28 of the first and second discs 16, 18 so that the peripheral portions 22, 28 thereof define a chain track peripheral portion 34 substantially as shown.

To insure that the width of the chain track peripheral portion 34 is maintained substantially uniform, and to further insure that the chain track peripheral portion 34 is adapted to receive and frictionally engage driving elements of the saw chain 14, a plurality of spatially disposed disc connector members 36 are disposed within the relief opening 32 formed by the first and second discs 16, 18 so as to transverse the relief opening 32 a selected distance, such as distance 38, from the chain track peripheral portion 34. Any suitable means or elements can be employed as the disc connector members 36 for securing the first and second discs 16, 18 in a fixed relationship one with another. For instance, desirable results have been obtained wherein a compression weld is employed to form the disc connector members 36 for securing the first and second discs 16 and 18 together at a position substantially intermediate the medial portions 20, 26 of the first and second discs 16, 18 and the chain track peripheral portion 34 defined therebetween. Thus, except for the portion of the relief opening 36 occupied by the transversing spacer members 36, the chain track peripheral portion 34 is a continuous extension of the relief opening 32 (illustrated as having a substantially V-shaped cross-sectional configuration) formed between the medial portions 20 and 26 of the peripheral portions 22 and 28 of the radially diverging first and second discs 16 and 18.

Referring now to FIGS. 1 and 3, the saw chain 14, illustrated as a endless, conventional cross-cut saw chain, comprises a plurality of cutter elements 40 projecting outwardly from one side thereof, a plurality of drive link elements, such as drive link element 42 illustrated in FIG. 3, projecting outwardly from an opposite side thereof, and joint or connector link elements 44 for interconnecting the cutter elements 40 and the drive link elements 42 to form an endless saw chain 14. The saw chain 14 utilized in the circular saw blade assembly 10 of the present invention is of conventional construction, and thus includes left-hand cutter links 46, right-hand cutter links 48, right-hand raker links 50 and left-hand raker links 52. The right and left-handed raker links, which function during cutting to rake out the bottom of the saw kerf, are generally not sharped, whereas the right and left-handed cutter links which function as the cutting portion of the saw chain, are sharpened along their leading edge.

In securing the saw chain 14 to the circular blade 12, the drive-link elements 42 of the saw chain 14 are disposed within the chain track peripheral portion 34 and frictionally engage facing side portions 54 and 56 of the first and second discs 16, 18 defining the chain track peripheral portion 34. The ends of the saw chain are then connected together using a connector or joint connector link 44 in a conventional manner so that the saw chain 14 is substantially taut around the peripheral portion of the circular blade 12. Further, because of the unique construction of the circular blade 12, the width of the saw chain 14 is greater than the width of the portion of the circular blade 12 defining the chain track peripheral portion 34. Thus, in operation, the kerf produced by the cutters has sufficient clearance for the circular blade 12 to enable the saw to move smoothly through the kerf without binding due to the engagement of the circular blade 12 with the wood.

From the description hereinbefore, it is apparent that the circular saw blade assembly 10 can be fabricated without the need of precise milling to form the chain track portion of the assembly; and that the unique design of the circular saw blade 12 permits the saw chain 14 to be positionable about the circular saw blade 12 without the need of connector pins to prevent rotary movement of the saw chain 14 relative to the saw blade 12, including radial outward movement of the saw blade 12 due to centrifugal force generated during the operation of the saw. Further, the unique design of the circular saw blade assembly 10, and thus the chain track peripheral portion 34 thereof, readily permits the chain track peripheral portion 34 to be adjusted to receive and frictionally engage drive link elements of a saw chain of varying sizes and widths thereby providing a desired versatility to a circular saw blade assembly heretofore unachievable by prior art devices.

The construction of the circular saw blade assembly 10 of the present invention can be economically and quickly fabricated. In constructing the circular saw blade 12 of the circular saw blade assembly 10, the first disc 16 is fabricated of a desired size and the central bore 24 is drilled through the medial portion 20 of the first disc 16. Similarly, a second disc 18, having the same dimensions as the first disc 16, is fabricated and the central bore 30 formed in the medial portion 26 thereof, the central bore 30 having the same dimensions as the central bore 24 of the first disc 16. The first and second discs 16, 18, are then flared in the direction of their respective pheripheral portions 22, 28, and thereafter disposed substantially adjacent one another such that the medial portions 20, 26 of the first and second discs 16, 18 are abutted and the relief opening 32 (a substantially V-shaped opening) is formed therebetween. Thus, the peripheral portions 22 and 28 of the first and discs 16, 18 define the chain track peripheral portion 34 of the circular saw blade assembly 10. To connect the first and second disc 16 and 18, the connector members 36 are positioned or formed within the relief opening 32 a distance below the chain track peripheral portion 34, such as represented by the distance 38, so that the connector members 36 do not interfere with the drive link elements 42 disposed within the chain track peripheral portion 34 of the circular blade 12. As previously stated, any suitable means can be employed to form the connector members 36, for connecting the first and second discs 16 and 18 together at the selected distance 38 below the chain track peripheral portion 34. Especially desirable results have been obtained wherein a plurality of compression welds are utilized to connect the first disc 16 to the second disc 18. In addition, the connector members 36 function as spacer elements to provide the chain track peripheral portion 34 with the desired width such that when the drive link elements 42 of the saw chain 14 is disposed within the chain track peripheral portion 34 the drive link elements frictionally engage the facing side portions 54 and 56 of the first and second discs 16 and 18 and are secured within the chain track peripheral portion 34. It should be noted that, except for the connection of the first and second discs 16 and 18 via the connector members 36, the first and second discs 16 and 18 remain as separate elements which cooperate to define the chain track peripheral portion 34 of the saw blade 12.

The circular saw blade assembly 10 can be fabricated of any suitable materials capable of being utilized as a circular blade for a power-driven saw. Further, experimental data indicates that by contructing a circular saw blade in accordance with the present invention the tendency of a saw chain to be displaced outwardly due to centrifugal force generated during the rotation of the blade is substantially eliminated. Thus, the circular saw blade assembly 10 of the present invention is well adapted to carry out the objects and attain the ends and advantages mentioned as well as those inherent therein. It will be understood that numerous changes may be made which will readily suggest themselves to those skilled in the art which are encompassed within the spirit of the invention and as defined in the appended claims.

What is claimed is

1. A circular saw blade assembly adapted to be secured to a power-driven saw arbor and rotated thereby, the circular saw comprising:
    a circular saw blade formed of first and second discs, the first and second discs each being characterized as having a medial portion, a peripheral portion and a central bore extending through the medial portion, the medial portions being disposed substantially adjacent so that the bores therein are aligned and adapted to receive the power-driven saw arbor in an assembled mode of the first and second discs, the first and second discs diverging radially from the medial portion defining the bore to form a relief opening extending to the peripheral portion of the discs so that the peripheral portions of the first and second discs define a chain track peripheral portion;
    disc connector means disposed within the relief opening for connecting the first and second discs at a position between the medial portions of the first and second discs and the chain track peripheral portion in the assembled mode thereof; and,
    a saw chain having a plurality of cutter elements projecting outwardly from one side thereof and a plurality of drive link elements projecting outwardly from an opposite side thereof, the saw chain extendible about the perimeter of the first and second discs such that the drive link elements are disposed within the chain track peripheral portion and frictionally engage the first and second discs defining the chain track peripheral portion.

2. The circular saw blade assembly of claim 1 wherein the disc connector means comprises:
    a plurality of spatially disposed connector members secured to the first and second discs, the connector members being disposed within the relief opening so as to transverse the relief opening a selected distance from the chain track peripheral position.

3. The circular saw blade assembly of claim 2 wherein the saw chain is an elongated member having a first end and an opposed second end, and wherein the saw chain further comprises a connector link element for connecting the first and second ends of the saw chain when the saw chain is disposed about the circular saw blade.

4. An improved circular saw blade assembly for use with a circular saw and adapted to support a detachable, endless saw chain about the perimeter of the saw blade assembly, the saw chain having a plurality of cutter elements projecting outwardly from one side thereof, a plurality of drive link elements projecting outwardly from an opposite side thereof, and at least one connector link element for connecting end portions of the saw chain when same is disposed about the perimeter of the saw blade assembly, the circular saw blade assembly comprising:
    a first disc having a medial portion, a peripheral portion, and a centrally disposed bore extending through the medial portion thereof;
    a second disc having a medial portion, a peripheral portion, and a centrally disposed bore extending through the medial portion thereof, the medial portion of the second disc defining the bore therein being disposed substantially adjacent the medial portion of the first disc such that the bores of the first and second discs are aligned, the first and second discs diverging outwardly from the medial portions thereof and forming an internally disposed relief opening extending from a portion of the medial portion of each of the first and second discs to the peripheral portion thereof such that the peripheral portions of the first and second disc define a chain track adapted to receive and frictionally engage the drive elements of the saw chain for securing the saw chain within the chain track; and,
    disc connector means disposed within the relief opening a selected distance from the chain track for connecting the first and second discs and for providing rigidity to the first and second discs.

5. An improved circular saw blade assembly of claim 4 wherein the disc connector means comprises:
    a plurality of spatially disposed spacer members secured to the first and second discs such that the spacer members transverse the relief opening formed between the first and second discs.

* * * * *